US011307790B2

(12) United States Patent
Lin et al.

(10) Patent No.: US 11,307,790 B2
(45) Date of Patent: Apr. 19, 2022

(54) METHOD, DEVICE, AND COMPUTER PROGRAM PRODUCT FOR MANAGING DATA PLACEMENT

(71) Applicant: EMC IP Holding Company LLC, Hopkinton, MA (US)

(72) Inventors: Zhenzhen Lin, Shanghai (CN); Pengfei Wu, Shanghai (CN); Si Chen, Shanghai (CN); Anzhou Hou, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 191 days.

(21) Appl. No.: 16/574,799

(22) Filed: Sep. 18, 2019

(65) Prior Publication Data

US 2020/0401317 A1 Dec. 24, 2020

(30) Foreign Application Priority Data

Jun. 24, 2019 (CN) .......................... 201910548385.8

(51) Int. Cl.
*G06F 3/06* (2006.01)
*H04L 9/06* (2006.01)

(52) U.S. Cl.
CPC ............ *G06F 3/065* (2013.01); *G06F 3/0604* (2013.01); *G06F 3/067* (2013.01); *G06F 3/0619* (2013.01); *G06F 3/0653* (2013.01); *H04L 9/0637* (2013.01); *H04L 2209/38* (2013.01)

(58) Field of Classification Search
CPC ...... G06F 3/0604; G06F 3/0619; G06F 3/065; G06F 3/0653; G06F 3/067; G06F 3/0671; H04L 2209/38; H04L 9/0637; H04L 9/3239
See application file for complete search history.

(56) References Cited

U.S. PATENT DOCUMENTS

| 9,959,047 | B2 * | 5/2018 | Cheng | G06F 3/0608 |
| 2017/0169038 | A1 * | 6/2017 | Borate | G06F 16/128 |
| 2020/0097452 | A1 * | 3/2020 | Nomura | G06F 16/2255 |
| 2020/0117550 | A1 * | 4/2020 | Zhang | H04L 9/3239 |
| 2020/0183802 | A1 * | 6/2020 | Rathi | G06F 11/1458 |
| 2020/0233838 | A1 * | 7/2020 | Morton | G06F 11/1469 |
| 2020/0409908 | A1 * | 12/2020 | Ahn | G06F 3/0664 |

\* cited by examiner

*Primary Examiner* — Zhuo H Li
(74) *Attorney, Agent, or Firm* — Ryan, Mason & Lewis, LLP (57) ABSTRACT

The present disclosure relates to a method, device and computer program product for managing data placement. In the method for managing data placement, in response to receiving a backup request for backing up raw data, the raw data is stored in a first storage system so as to form a raw copy. Metadata corresponding to the raw data is obtained, the metadata comprising abstract information of the raw data. The metadata is stored in a blockchain system in a second storage system so as to form a metadata copy, the first storage system and the second storage system being independent storage systems provided by a first vendor and a second vendor respectively. The raw data is managed by using the raw copy and the metadata copy. In the present disclosure, the raw copy and the metadata copy are stored to different storage systems, so that it may be judged whether a copy has been tampered with, and further higher security may be provided.

20 Claims, 9 Drawing Sheets

METHOD, DEVICE, AND COMPUTER PROGRAM PRODUCT FOR MANAGING DATA PLACEMENT

RELATED APPLICATION(S)

The present application claims priority to Chinese Patent Application No. 201910548385.8, filed Jun. 24, 2019, and entitled "Method, Device and Computer Program Product for Managing Data Placement," which is incorporated by reference herein in its entirety.

FIELD

Various implementations of the present disclosure relate to data storage, and more specifically, to a method, device and computer program product for managing data placement in a storage system.

BACKGROUND

With the development of data storage technologies, various types of storage systems, such as centralized storage and distributed storage, have been developed, and a large number of storage service vendors for providing storage services have emerged. For users, they can select among multiple storage service vendors to store data. Users put forward high requirements on the capacity, reliability and integrity of storage systems. Therefore, how to manage data displacement more reliably and effectively becomes a focus of research.

SUMMARY

Therefore, it is desirable to develop and implement a technical solution for managing data placement more effectively. It is desired that the technical solution can be compatible with an existing processing system and manage data placement in the storage system more effectively by reconstructing configurations of the existing storage system.

According to a first aspect of the present disclosure, there is provided a method for managing data placement. In the method, in response to receiving a backup request for backing up raw data, the raw data is stored in a first storage system so as to form a raw copy. Metadata corresponding to the raw data is obtained, the metadata comprising abstract information of the raw data. The metadata is stored in a blockchain system in a second storage system so as to form a metadata copy, the first storage system and the second storage system being independent storage systems provided by a first vendor and a second vendor respectively. The raw data is managed by using the raw copy and the metadata copy.

According to a second aspect of the present disclosure, there is provided a device for managing data placement. The device comprises: at least one processing unit; and at least one memory coupled to the at least one processing unit and having instructions stored thereon for being executed by the at least one processing unit, the instructions, when executed by the at least one processing unit, causing the device to perform acts. The acts include: in response to receiving a backup request for backing up raw data, storing the raw data in a first storage system so as to form a raw copy; obtaining metadata corresponding to the raw data, the metadata comprising abstract information of the raw data; storing the metadata in a blockchain system in a second storage system so as to form a metadata copy, the first storage system and the second storage system being independent storage systems provided by a first vendor and a second vendor respectively; and managing the raw data by using the raw copy and the metadata copy.

According to a third aspect of the present disclosure, there is provided a computer program product. The computer program product is tangibly stored on a non-transient computer readable medium and comprises machine executable instructions which are used to implement a method according to the first aspect of the present disclosure.

BRIEF DESCRIPTION OF THE DRAWINGS

Through the more detailed description in the accompanying drawings, features, advantages and other aspects of the implementations of the present disclosure will become more apparent. Several implementations of the present disclosure are illustrated schematically and are not intended to limit the present invention. In the drawings.

DETAILED DESCRIPTION

The preferred implementations of the present disclosure will be described in more detail with reference to the drawings. Although the drawings illustrate the preferred implementations of the present disclosure, it should be appreciated that the present disclosure can be implemented in various manners and should not be limited to the implementations explained herein. On the contrary, the implementations are provided to make the present disclosure more thorough and complete and to fully convey the scope of the present disclosure to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The terms "one example implementation" and "one implementation" are to be read as "at least one example implementation." The term "a further implementation" is to be read as "at least a further implementation." The terms "first," "second" and so on can refer to same or different objects. The following text also can comprise other explicit and implicit definitions.

Figure 1:
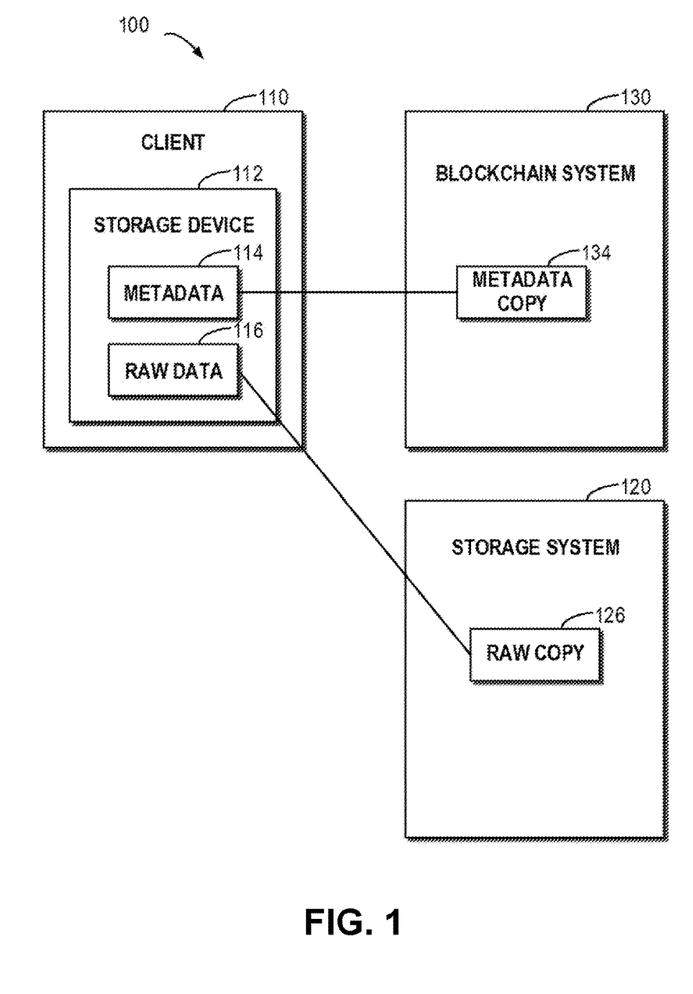
FIG. 1 schematically illustrates a block diagram of a process for managing data placement according to one technical solution.

FIG. 1 schematically shows a block diagram 100 of a process for managing data placement according to one technical solution. As depicted, a client 110 may comprise a storage device 112, and the storage device 112 may store raw data 116. The raw data 116 may comprise user data, e.g. the raw data 116 may comprise file types such as text, image, audio and video. For another example, the raw data 116 may further comprise images of an operating system, an application system, and a data system at the client 110. To guarantee the reliability of data in the storage device 112, backup operations may be performed to a storage system 120 at different time points so as to form multiple copies in the storage system 120. For example, the raw data 116 may be stored to the storage system 120 to form a raw copy 126.

It will be understood that while the storage system 120 is running, the storage system 120 might be attacked by hackers, malware and/or others. For example, malware might tamper with content of the raw copy 126, so that the raw copy 126 becomes inconsistent with the initial raw data 116. On the other hand, since users do not completely trust the vendor of the storage system 120, the vendor of the storage system 120 also might tamper with the raw copy 126. At this point, the data integrity of the raw copy 126 might be broken. When the client 110 sends a recovery request to the storage system 120, if the raw copy 126 is directly sent to the client 110, then data which has been tampered with might be sent to the client 110. This will pose a threat to the normal running of the client 110.

In order to guarantee the integrity of data, there has been proposed a technical solution for verifying based on metadata 114 whether the raw copy 126 from the storage system 120 has been tampered with or not. In the technical solution, metadata 114 of the raw data 116 may be generated and then sent to a blockchain system 130 so as to form a metadata copy 134. Since the blockchain system 130 is immutable, the metadata copy 134 cannot be changed. During a recovery operation, new metadata may be generated based on the raw copy 126, and then the new metadata may be compared with the metadata copy 134 to determine whether the raw copy 126 has been tampered with. If the newly generated metadata is consistent with the metadata copy 134, this means the raw copy 126 is trusted and not modified. If the newly generated metadata is inconsistent with the metadata copy 134, this means the raw copy 126 is untrusted and has been modified.

It will be understood that although FIG. 1 depicts only one client 110 and its raw data 116 and metadata 114, there may exist more clients, more raw data 116 and more metadata 114 in real application environments. Further, backups may be performed to the raw data 116 at multiple different points, so as to generate multiple raw copies 126 and multiple metadata copies 134. Although the above approach can verify whether the raw copy 126 has been tampered with, when there exists a lot of raw data 116, many metadata copies 134 will be generated. At this point, huge workloads will be produced in the blockchain system 130. In a hybrid storage environment comprising multiple storage systems, it is desirable to provide a technical solution for managing data placement more effectively.

To solve the above drawbacks, implementations of the present disclosure provide a method, device and computer program product for managing data placement. According to example implementations of the present disclosure, the concept of data separation is introduced. Specifically, the raw data 116 and the metadata 114 may be stored in different storage systems, with the various storage systems being provided by different storage service vendors. Even if the administrator of a storage system may tamper with raw data in the storage system, since the administrator cannot tamper with metadata in other storage systems, by comparing metadata generated based on the raw data 116 with metadata stored in other storage systems, it may be determined whether the raw data has been tampered with or not. Further, in a hybrid storage environment where multiple storage systems are provided, each storage system may be in a different state, at which point storage systems for storing the metadata 114 and the raw data 116 may be selected respectively based on states of various storage systems.

Figure 2:
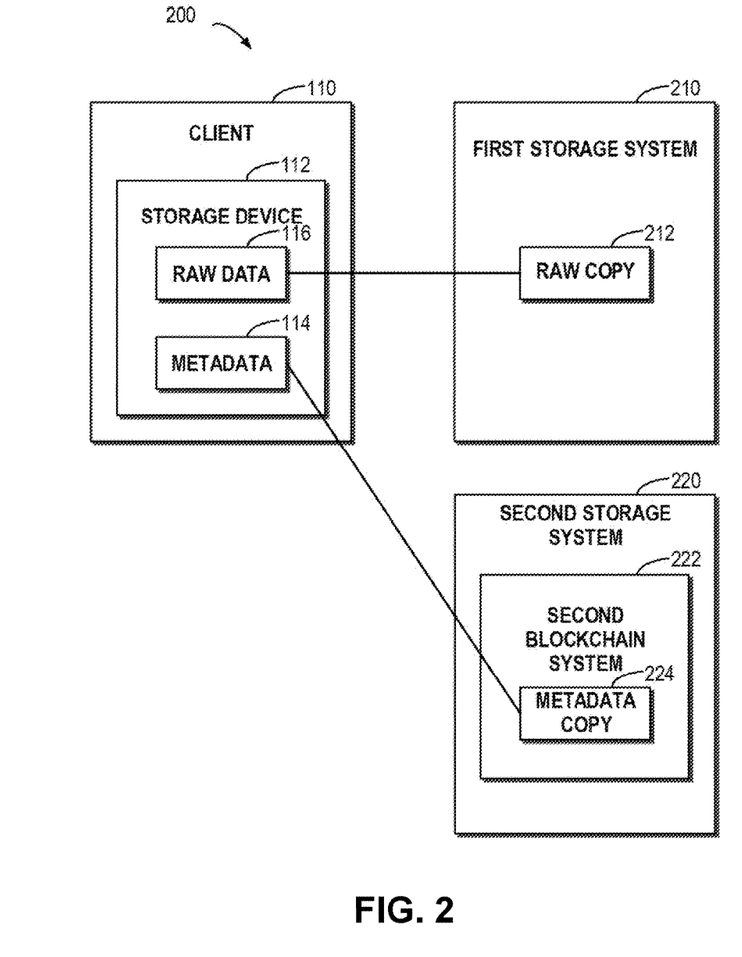
FIG. 2 schematically illustrates a block diagram of a process for managing data placement according to example implementations of the present disclosure.

With reference to FIG. 2, a brief description is presented below of principles of the present disclosure. FIG. 2 schematically shows a block diagram 200 for data placement according to example implementations of the present disclosure. As depicted, a client 110 may comprise a storage device 112, and the storage device 112 may store raw data 116 and metadata 114 corresponding to the raw data. There may exist multiple storage system to be used by the client 110. For example, the client 110 may select a desired storage system from multiple storage systems in a hybrid storage environment. For example, a first storage system 210 and a second storage system 220 may come from different service vendors and have different performance.

According to example implementations of the present disclosure, while performing a backup to the raw data 116, the raw data 116 may be stored to the first storage system 210 to form a raw copy 212. Metadata 114 corresponding to the raw data 116 may be generated, the metadata 114 comprising abstract information of the raw data 116. In order to guarantee the raw data 116 and the metadata 114 are independent of each other, the metadata 114 may be stored in a second blockchain system 222 in the second storage system 220 to form a metadata copy 224. Here, the first storage system 210 and the second storage system 220 are independent storage systems provided by a first vendor and a second vendor respectively. Subsequently, the raw data 116 may be managed based on the raw copy 212 and the metadata copy 224.

With example implementations of the present disclosure, by storing copies of the raw data 116 and the metadata 114 to the first storage system 210 and the second storage system 220 respectively, it may be guaranteed that the administrator of neither storage system can tamper with both of the raw copy 212 and the metadata copy 224. In this way, when either of the raw copy 212 and the metadata copy 224 is tampered with, the data integrity may be verified by comparing metadata. Further, by building the second blockchain system 222 in the second storage system 220, a copy of the corresponding metadata 114 of the raw data 116 may be stored in a distributed fashion, and thus large workloads which might be caused by storing a metadata copy in a single blockchain system may be reduced.

According to example implementations of the present disclosure, there is provided a method for managing data placement. More details about example implementations of the present disclosure will be described with reference to FIG. 3 below. This figure schematically shows a flow chart of a method 300 for managing data placement according to example implementations of the present disclosure. At block 310, it may be determined whether a backup request for backing up raw data 116 is received or not. If the backup request is received, then the method 300 proceeds to block 320. At block 320, the raw data 116 is stored in a first storage system 210 to form a raw copy 212. According to example implementations of the present disclosure, multiple states of multiple storage systems where the raw copy 212 may be stored may be collected respectively. Subsequently, the first storage system 210 for storing the raw copy 212 may be selected from the multiple storage systems based on the multiple states.

Figure 3:
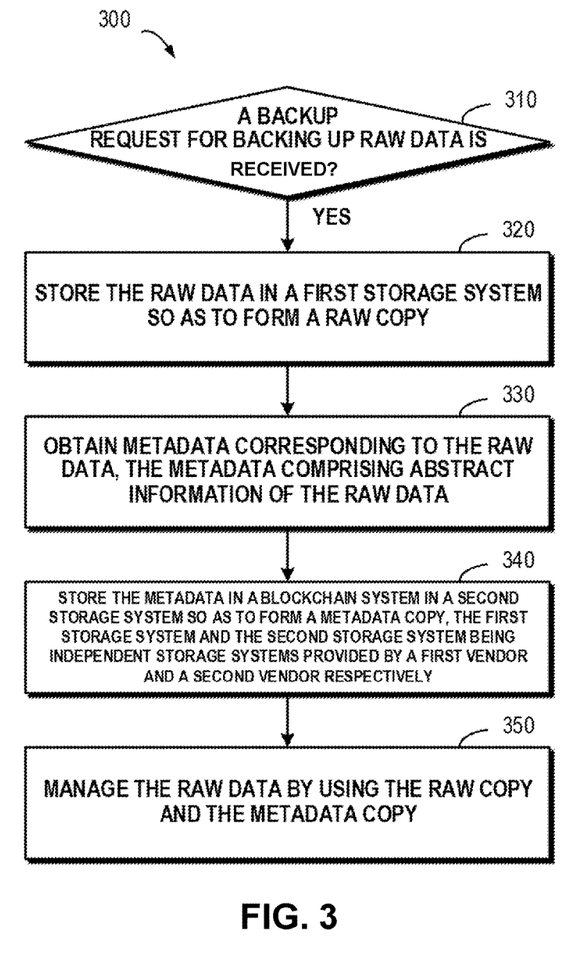
FIG. 3 schematically illustrates a flow chart of a method for managing data placement according to example implementations of the present disclosure.

According to example implementations of the present disclosure, the state of a storage system may comprise multiple respects. Specifically, regarding a given storage system among the multiple storage systems, at least one of the following states of the given storage system may be determined: a name, vendor, storage space, data throughput, latency, error rate and priority of the given storage system. With example implementations of the present disclosure, information on multiple respects of the given storage system may be monitored, so that appropriate storage systems may be selected for storing the raw copy 212 and a metadata copy 224.

According to example implementations of the present disclosure, the name of a storage system may be used to distinguish a respective storage system. The vendor of a storage system refers to an identifier of the vendor for providing storage services. The storage space may represent available storage space and/or all storage space in the given storage system. The data throughput refers to the data transmission amount of the given storage system within certain time limits, e.g. may be denoted as bps (bits per second). The latency may represent a historical wait time before the backup request is handled, e.g. may be denoted as seconds. The error rate may represent the extent to which errors occur during transmission. The priority may represent the priority that the given storage system will be selected as the first storage system 210 or the second storage system 220.

With example implementations of the present disclosure, whether the given storage system is selected may be evaluated from the above states. For example, the priority may be calculated based on at least one of the storage space, data throughput, latency and error rate. A corresponding weight may be set to each respect. According to example implementations of the present disclosure, the larger the storage space, the higher the priority; the higher the data throughput, the lower the priority; the longer the latency, the lower the priority; the higher the error rate, the lower the priority, etc.

At block 330, metadata 114 corresponding to the raw data 116 is obtained, the metadata 114 comprising abstract information of the raw data 116. It will be understood that the manner in which the abstract information is generated is not intended to be limited here, but the abstract information of the raw data 116 may be generated using various approaches, as a specific application environment demands. According to example implementations of the present disclosure, the abstract information may be generated based on algorithms such as MD5, SHA1, SHA256, CRC, etc. In the context of the present disclosure, the abstract information may further be referred to as a "hash." It will be understood that besides the above abstract information, the metadata 114 may further comprise other information, such as a file structure, attributes, access information, and a checksum associated with the raw data 116.

According to example implementations of the present disclosure, when the raw data 116 comprises a large data amount, first the raw data 116 may be divided into multiple fragments, and corresponding abstract information may be generated for each fragment, e.g. a corresponding hash may be generated for each fragment based on the MD5 algorithm. Subsequently, according to a predetermined algorithm, a final hash may be obtained by using the multiple hashes, as the abstract information of the raw data 116. Suppose the raw data 116 is divided into 8 fragments, and 8 hashes are generated based on MD5. Next, the 8 hashes may be concatenated, and the final hash may be obtained using a concatenation result based on MD5 or another algorithm.

At block 340, the metadata 114 is stored to a second blockchain system 222 in the second storage system 220 so as to form a metadata copy 224. The first storage system 210 and the second storage system 220 are independent storage systems provided by a first vendor and a second vendor respectively. It will be understood that the first vendor and the second vendor are independent. Even if one of the two vendors may tamper with data in the storage system provided by itself, since copies of the metadata 114 and the raw data 116 are saved in different storage systems, the other copy will not be tampered with. At this point, it may be determined through a simple comparison whether the copy of the raw data 116 has been tampered with.

Description has been presented of a specific process of selecting a storage system for storing the copy of the raw data 116 based on states of the multiple storage systems. Similarly, multiple states of the multiple storage systems in which the copy of the metadata 114 may be stored may be collected respectively. Subsequently, the second storage system 220 for storing the metadata copy may be selected among the multiple storage systems based on the multiple states. With example implementations of the present disclosure, appropriate storage systems for storing the raw copy 212 and the metadata copy 224 may be selected respectively based on states of the storage systems.

Figure 4:
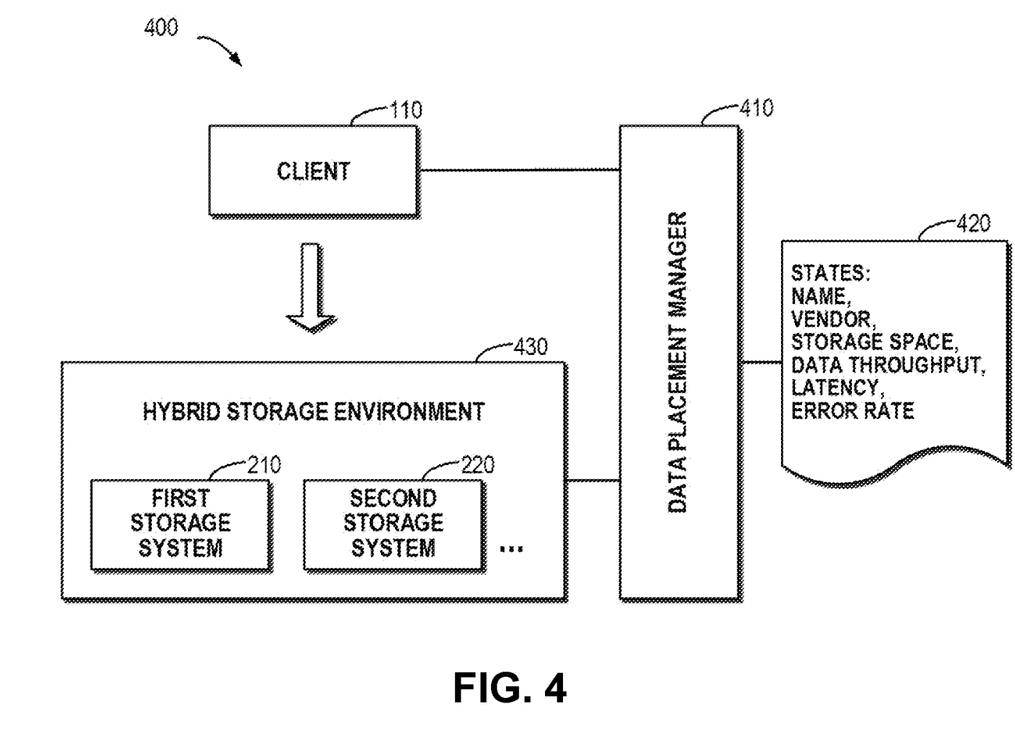
FIG. 4 schematically illustrates a block diagram of a process for managing data placement based on states of multiple storage systems according to example implementations of the present disclosure.

FIG. 4 schematically shows a block diagram 400 of a process for managing data placement based on states of multiple storage systems according to example implementations of the present disclosure. As depicted, a data placement manager 410 may be provided for implementing the above method 300. It will be understood that although the data placement manager 410 is shown as an independent module in FIG. 4, the data placement manager 410 may be implemented as a program and may run in any computing device in an application environment. For example, the data placement manager 410 may run at the client 110, any storage system in a hybrid storage environment 430, or an independent computing device.

As depicted, the data placement manager 410 may collect states 420 of various storage systems in a hybrid storage environment 430, which states may comprise, for example, a name, vendor, storage space, data throughput, latency, error rate, etc. The data placement manager 410 may further determine priorities of various storage systems based on collected states, so that when a backup request is received from the client 110, storage systems for storing copies of the metadata 114 and the raw data 116 associated with the backup request may be selected.

Figure 5:
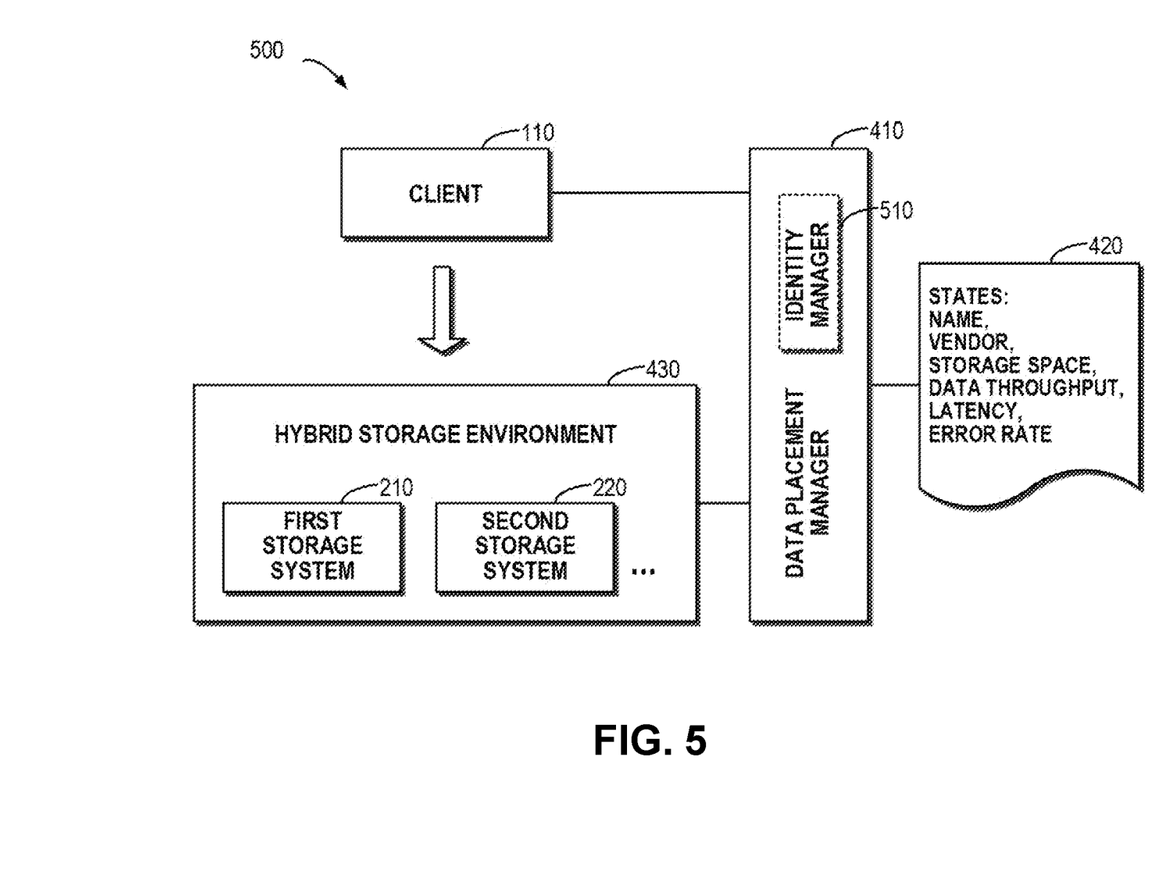
FIG. 5 schematically illustrates a block diagram of a working environment of an identity manager for managing an identity of a client according to example implementations of the present disclosure.

According to example implementations of the present disclosure, identity management may further be applied to the client 110. Specifically, FIG. 5 schematically shows a block diagram 500 of a working environment of an identity manager 510 for managing an identity of the client 110 according to example implementations of the present disclosure. As depicted, the identity manager 510 may be responsible for identity validation of the client 110. Although as shown in FIG. 5 the identity manager 510 resides in the data placement manager 410, the identity manager 510 may be implemented as a program and run in any computing device in the application environment. For example, the identity manager 510 may run at the client 110, any storage system in the hybrid storage environment 430, or an independent computing device. More details about identity validation will be described with reference to a backup operation shown in FIG. 6 below.

It will be understood that since identity management decides which clients may access the raw data 116 and further affects data security, it is desirable to perform identity management in a trusted way. According to example implementations of the present disclosure, the identity manager 510 may be implemented based on blockchain technology. For example, the identity manager 510 may be implemented in the second blockchain system 222 as shown in FIG. 2. For another example, the identity manager 510 may further be implemented in a blockchain system other than the second blockchain system 222.

Figure 6:
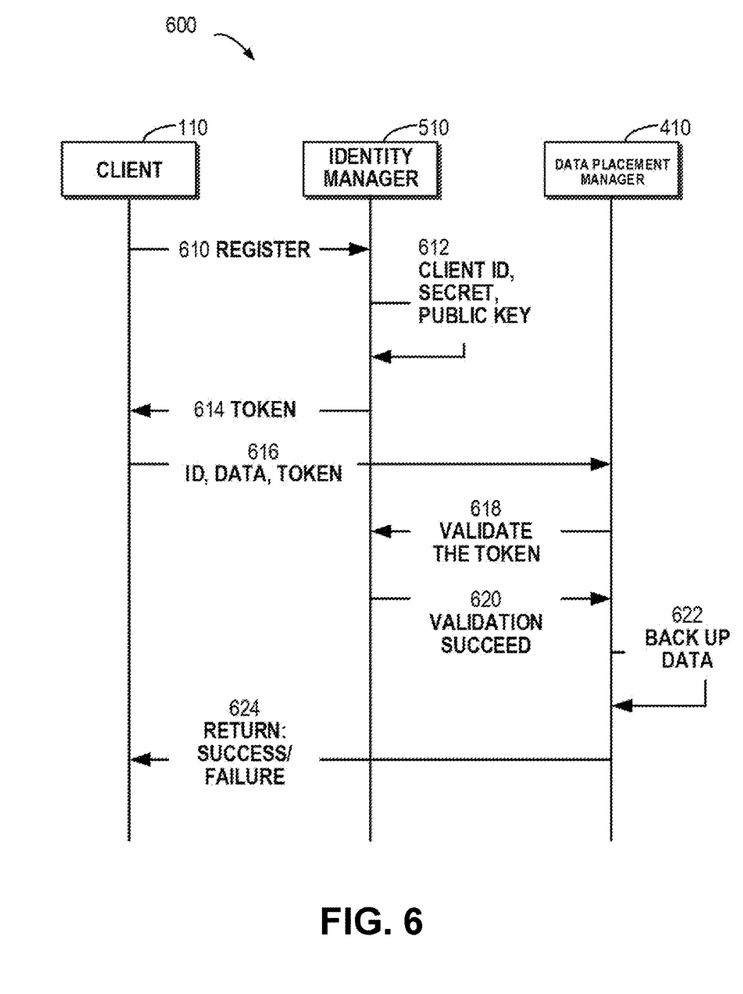
FIG. 6 schematically illustrates a block diagram of a process for backing up raw data according to example implementations of the present disclosure.

FIG. 6 schematically shows a block diagram 600 of a process for backing up the raw data 116 according to example implementations of the present disclosure. As depicted, the client 110 may send a registration request to the identity manager 510 (as shown by arrow 610). Upon receipt of the registration request, the identity manager 510 may validate client ID, a secret and a public key of the client (as shown by arrow 612). When the identity manager 510 is implemented based on blockchain technology, the client ID, secret, public key, generated token and/or other information associated with user registration may be stored to a node in an identity blockchain. Since the identity blockchain is immutable, the security during identity management may be increased significantly. After the registration succeeds, the identity manager 510 may send the token to the client 110 (as shown by arrow 614). Then the client 110 may send the ID, data to be backed up and the token to the data placement manager 410, just as shown by arrow 616.

As shown by arrow 618, the data placement manager 410 may validate the token. Continuing the above example, the data placement manager 410 may query the identity blockchain to confirm whether the token matches one stored in the identity blockchain or not. If they match, as shown by arrow 620, the data placement manager 410 may receive a validation success notification from the identity manager 510. Subsequently, the data placement manager 410 backs up data at arrow 622 and returns a success/failure message to the client 110 (as shown by arrow 624). The process for backing up data is the process of the method 300 described with reference to FIG. 3 above. It will be understood that FIG. 6 merely shows a schematic process of the backup operation, and according to example implementations of the present disclosure, the backup operation may further comprise more or less steps.

Returning to FIG. 3, at block 350, the raw data 116 is managed by using the raw copy 212 and the metadata copy 224. With example implementations of the present disclosure, since the first storage system 210 and the second storage system 220 come from different vendors, even if the administrator of one storage system may tamper with data in that storage system, the data integrity may be more effectively guaranteed by using the raw copy 212 and the metadata copy 224. The management process at block 350 mainly relates to data recovery, more details about which will be described with reference to FIG. 7 below.

Figure 7:
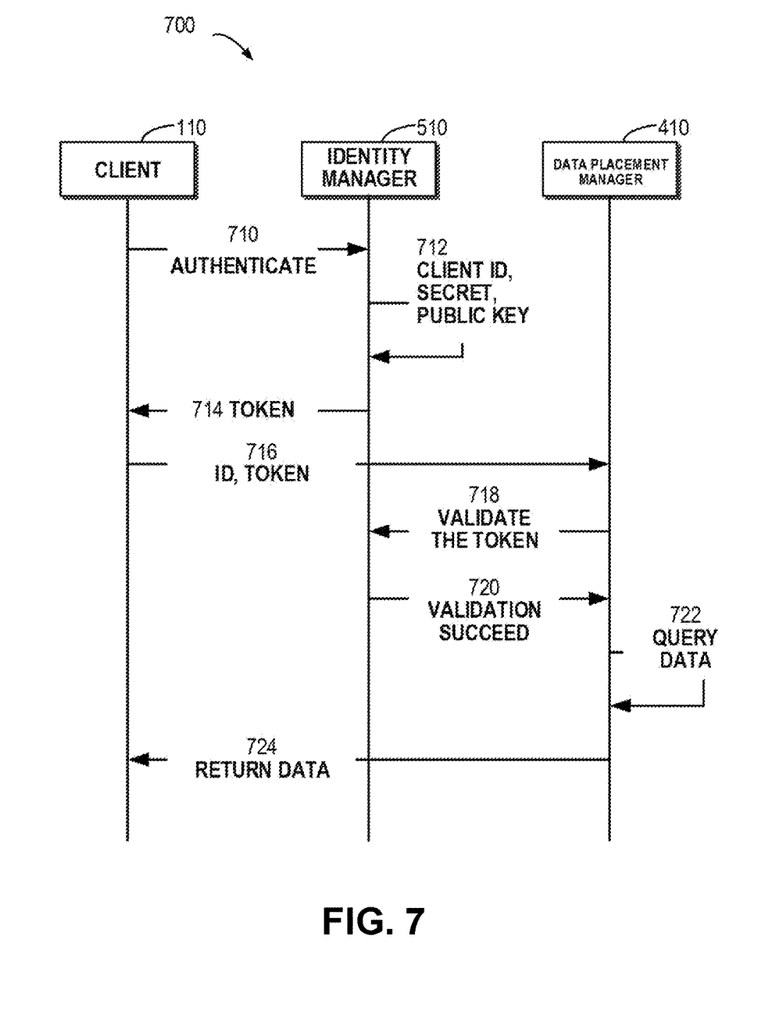
FIG. 7 schematically illustrates a block diagram of a process for recovering raw data according to example implementations of the present disclosure.

FIG. 7 schematically shows a block diagram 700 of a process for recovering the raw data 116 according to example implementations of the present disclosure. In the figure, as shown by arrow 710, the client 110 sends an authentication request to the identity manager 510. Then, the identity manager 510 validates a client ID, secret and public key at arrow 712 and sends a token to the client 110 after the validation succeeds (as shown by arrow 714). Afterwards, the client 110 sends the ID and token to the data placement manager 410 as shown by arrow 716. The data placement manager 410 sends a request for validating the token to the identity manager 510 at arrow 718. The data placement manager 410 receives a validation success signal from the identity manager 510 at arrow 720, queries data at arrow 722, and finally returns data to the client 110 at arrow 724.

According to example implementations of the present disclosure, the process of querying data involves making a query with the raw copy 212 and the metadata copy 224. Specifically, after receiving the recovery request for the raw data 116, the metadata copy 224 may be obtained from the second storage system 220. The metadata copy 224 is a copy which is stored in the second blockchain system 222. Subsequently, the raw copy 212 may be obtained from the first storage system 210, and metadata may be generated based on the raw copy 212. Then, the metadata copy 224 may be compared with the generated metadata to determine whether data has been tampered with.

With example implementations of the present disclosure, both the raw copy 212 and the metadata copy 224 may be stored in a more reliable fashion, so the tampering risk may be reduced. Further, even if one of the raw copy 212 and the metadata copy 224 is tampered with, by comparing the metadata copy 224 and the generated metadata, it may be accurately determined whether there is a tampering occurrence or not.

According to example implementations of the present disclosure, if it is determined that the generated metadata matches the metadata copy 224, then it is validated that the raw copy 212 is not changed, and the raw copy 212 may be returned to the client 110. According to example implementations of the present disclosure, if it is determined that the generated metadata does not match the metadata copy 224, then it is validated that the raw copy 212 has been changed. At this point, a notification may be returned to the client 110, indicating the raw copy 212 has been changed.

According to example implementations of the present disclosure, if it is determined that the generated metadata does not match the metadata copy 224, this means at least one of the raw copy 212 and the metadata copy 224 has been tampered with. Besides, this means at least one of the first storage system 210 and the second storage system 220 is unreliable. Therefore, the priority of the first storage system 210, the priority of the second storage system 220, or the priorities of both the first storage system 210 and the second storage system 220 may be reduced.

According to example implementations of the present disclosure, the first storage system 210 and the second storage system 220 are cloud-based storage systems. A number of cloud-based storage systems have emerged. With example implementations of the present disclosure, a blockchain system may be deployed at each cloud-based storage system so as to store a copy of the metadata 114. It will be understood that in addition to providing basic storage services, the cloud-based storage system may further be an open computing and service platform, and various services may be deployed in the cloud-based storage system so as to accomplish more functions. For example, the data placement manager 410 as described above may be deployed in the cloud-based storage system, so as to provide data placement management. For another example, the identity manager 510 described above may be deployed in the cloud-based storage system, so as to provide identity management.

In this way, it is easy to make the hybrid storage environment more reliable. For example, by building the above described data placement manager 410, a dedicated management mechanism may be realized independently of the client 110 and the hybrid storage environment 430, the reliability of the hybrid storage environment 430 may be improved, and further backup operations at the client 110 may be made more reliable.

According to example implementations of the present disclosure, the first storage system 210 and the second storage system 220 may be utilized in a crossover manner. Specifically, if a further backup request for backing up further raw data is received, the further raw data may be stored in the second storage system 220 to form a further raw copy. Further metadata corresponding to the further raw data may be generated, which comprises abstract information of the further raw data. The further raw data may be stored in the first storage system 210 to form a further metadata copy. Moreover, the further raw data may be managed with the further raw copy and the further metadata copy.

Figure 8:
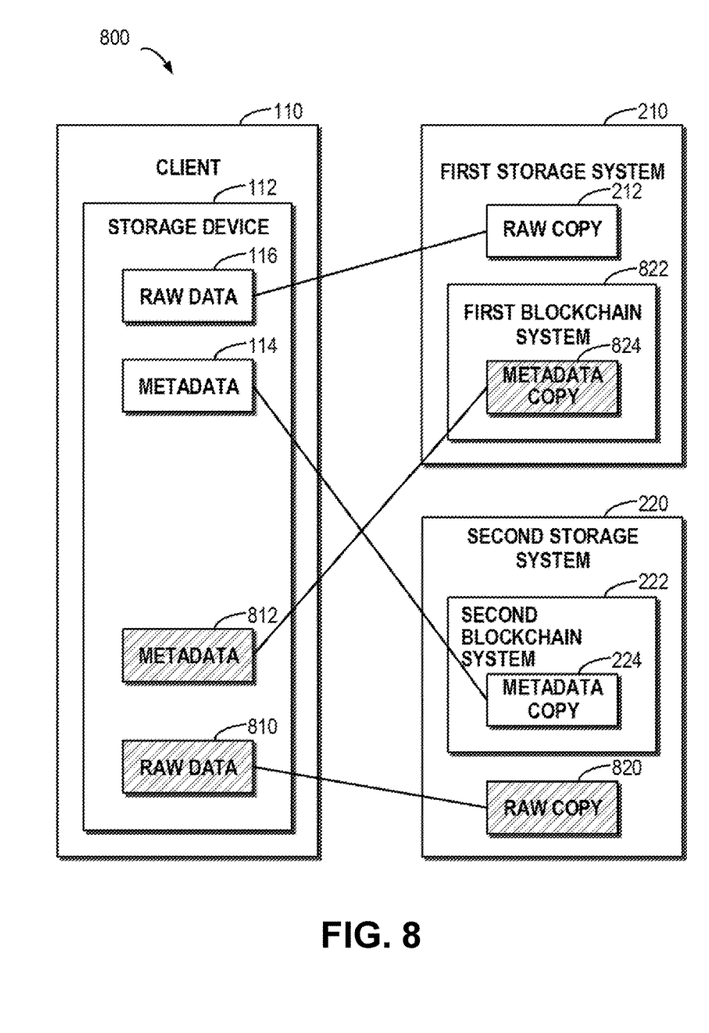
FIG. 8 schematically illustrates a block diagram for effecting data placement in a crossover manner according to example implementations of the present disclosure.

More details about data placement in multiple storage systems will be described with reference to FIG. 8 below. FIG. 8 schematically shows a block diagram 800 for effecting data placement in a crossover manner according to example implementations of the present disclosure. In the figure, metadata 812 associated with further raw data 810 is shown as shaded. As shown in FIG. 8, copies associated with the raw data 116 and the raw data 810 may be stored in the first storage system 210 and the second storage system 220 in a crossover manner. In other words, the raw copy 212 and the metadata copy 224 associated with the raw data 116 may be stored in the first storage system 210 and the second storage system 220 respectively. A raw copy 820 and metadata copy 824 (i.e. copy of the metadata 812) associated with the raw data 810 may be stored in the second storage system 220 and the first storage system 210 respectively.

It will be understood that in order to provide a more reliable storage approach, blockchain systems may be built in multiple storage systems for the purpose of storing copies of metadata. Specifically, the first storage system 210 may comprise a first blockchain system 822, and the second storage system 220 may comprise a second blockchain system 222. Since the blockchain system is immutable, this may guarantee that metadata copies are stored with a higher security level.

According to example implementations of the present disclosure, the raw data may be part of a larger raw data object. For example, the raw data object may be divided into a group of raw data blocks, and a raw data block may be selected as the raw data from the group of raw data blocks. According to example implementations of the present disclosure, the method described with reference to FIG. 3 may be performed to each data block in the group of raw data blocks.

Specifically, regarding a first data block in the group of raw data blocks, a copy of the first data block may be stored to the first storage system 210, and abstract information of the first data block may be stored to the second blockchain system 222 in the second storage system 220. Regarding a second data block in the group of raw data blocks, a copy of the second data block may be stored to the second storage system 220, and abstract information of the second data block may be stored to the first blockchain system 822 in the first storage system 210.

According to example implementations of the present disclosure, while selecting the first storage system 210 and the second storage system 220, an association between the two systems may be taken into consideration. For example, the association may be determined based on positions where the raw copy 212 and the metadata copy 224 are stored. Suppose the raw copy 212 of the raw data 116 is stored to the first storage system 210, and the metadata copy 224 of the raw data 116 is stored to the second storage system 220, then it may be considered the first storage system 210 and the second storage system 220 have an association between them. The association may be determined based on the amount of raw data having a copy relationship with the two storage systems, and the association may be proportional to the amount.

For example, suppose the raw copy 212 and the metadata copy 224 associated with the raw data 116 are stored in the first storage system 210 and the second storage system 220 respectively, at which point the association may be set to 1. For another example, suppose a raw copy and a metadata copy associated with further raw data are also stored in the first storage system 210 and the second storage system 220 respectively, at which point the association may be set to 2. According to example implementations of the present disclosure, since two copies associated with raw data are often stored in a crossover manner described with reference to FIG. 8, the association may further be determined based on the data amount of raw data stored across the two storage systems.

While determining priorities of various storage systems, priories may be determined based on associations among various storage systems. For example, suppose data in the first storage system 210 was once frequently tampered with and thus has lower security and further a lower priority, then at this point the priority of the second storage system 220 that has a higher association with the first storage system 210 may be reduced properly. For another example, suppose data in the first storage system 210 has never been tampered with and thus has higher security, at this point the first storage system 210 may have a higher priority. Further, the priority of the second storage system 220 that has a higher association with the first storage system 210 may be increased. With example implementations of the present disclosure, the priority of a storage system may be determined more effectively, and further appropriate storage systems for storing two copies associated with raw data may be selected from the hybrid storage environment.

While examples of the method according to the present disclosure have been described in detail with reference to FIGS. 2 to 8, description is presented below to the implementation of a corresponding apparatus. According to example implementations of the present disclosure, an apparatus is provided for managing data placement. The apparatus comprises: a first storage module configured to, in response to receiving a backup request for backing up raw data, store the raw data in a first storage system so as to form a raw copy; an obtaining module configured to obtain metadata corresponding to the raw data, the metadata comprising abstract information of the raw data; a second storage module configured to store the metadata in a blockchain system in a second storage system so as to form a metadata copy, the first storage system and the second storage system being independent storage systems provided by a first vendor and a second vendor respectively; and a management module configured to manage the raw data by using the raw copy and the metadata copy.

According to example implementations of the present disclosure, the apparatus further comprises: a collecting module configured to collect multiple states of multiple storage systems that are applicable to store either of the raw copy and the metadata copy, respectively; and a selecting module configured to select corresponding storage systems of the first storage system and the second storage system from the multiple storage systems based on the multiple states.

According to example implementations of the present disclosure, the collecting module is further configured to, regarding a given storage system among the multiple storage systems, determine at least one of the following states of the given storage system: a name, vendor, storage space, data throughput, latency, error rate and priority of the given storage system.

According to example implementations of the present disclosure, the management module is further configured to: in response to receiving a recovery request for the raw data, obtain the metadata copy from the second storage system; generate metadata based on the raw copy; and manage the raw data based on the metadata copy and the generated metadata.

According to example implementations of the present disclosure, the management module is further configured to: in response to determining the generated metadata matches the metadata copy, verify the raw copy as not changed; and return the raw copy.

According to example implementations of the present disclosure, the management module is further configured to: in response to determining the generated metadata does not match the metadata copy, verify the raw copy as changed; and return a notification indicating the raw copy has been changed.

According to example implementations of the present disclosure, the management module is further configured to: in response to determining the generated metadata does not match the metadata copy, reduce a priority of at least one of the first storage system and the second storage system.

According to example implementations of the present disclosure, the first storage system and the second storage system are cloud-based storage systems.

According to example implementations of the present disclosure, the first storage module is further configured to, in response to receiving a further backup request for backing up further raw data, store the further raw data in the second storage system to form a further raw copy; the obtaining module is further configured to obtain further metadata corresponding to the further raw data, the further metadata comprising abstract information of the further raw data; the second storage module is further configured to store the further metadata in the first storage system to form a further metadata copy; and the management module is further configured to manage the further raw data by using the further raw copy and the further metadata copy.

According to example implementations of the present disclosure, the apparatus further comprises a dividing module configured to: divide a raw data object into a group of raw data blocks; and select a raw data block as the raw data from the group of raw data blocks.

Figure 9:
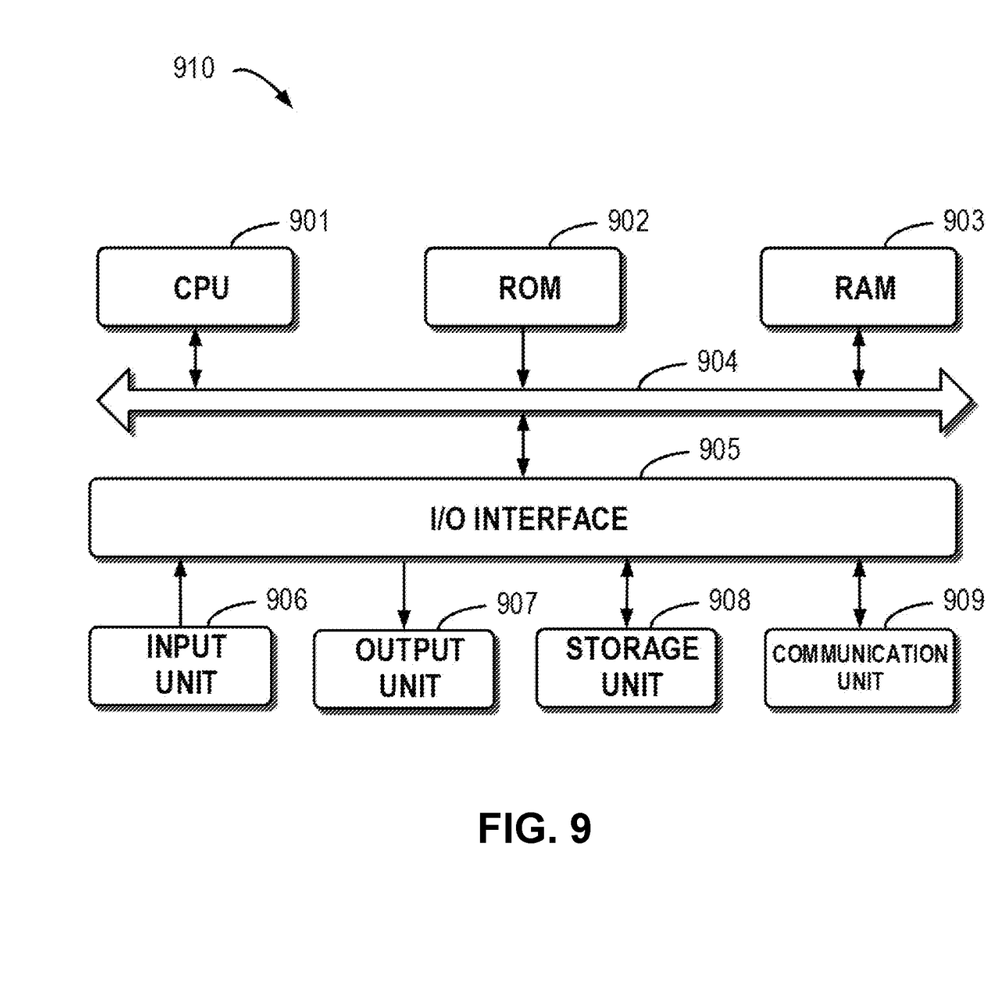
FIG. 9 schematically illustrates a block diagram of a device for managing data placement according to example implementations of the present disclosure.

FIG. 9 schematically shows a block diagram of a device 910 for managing data placement according to example implementations of the present disclosure. As depicted, the device 910 includes a central processing unit (CPU) 901, which can execute various suitable actions and processing based on the computer program instructions stored in the read-only memory (ROM) 902 or computer program instructions loaded in the random-access memory (RAM) 903 from a storage unit 908. The RAM 903 can also store all kinds of programs and data required by the operations of the device 910. CPU 901, ROM 902 and RAM 903 are connected to each other via a bus 904. The input/output (I/O) interface 905 is also connected to the bus 904.

A plurality of components in the device 910 is connected to the I/O interface 905, including: an input unit 906, such as keyboard, mouse and the like; an output unit 907, e.g., various kinds of displays and loudspeakers etc.; a storage unit 908, such as magnetic disk and optical disk etc.; and a communication unit 909, such as network card, modem, wireless transceiver and the like. The communication unit 909 allows the device 910 to exchange information/data with other devices via the computer network, such as Internet, and/or various telecommunication networks.

The above described processes, such as the method 300, can also be executed by the processing unit 901. For example, in some implementations, the method 300 can be implemented as a computer software program tangibly included in the machine-readable medium, e.g., the storage unit 908. In some implementations, the computer program can be partially or fully loaded and/or mounted to the device 910 via ROM 902 and/or the communication unit 909. When the computer program is loaded to the RAM 903 and executed by the CPU 901, one or more steps of the above described method 300 can be implemented. Alternatively, in other implementations, the CPU 901 also can be configured in other suitable manners to realize the above procedure/method.

According to example implementations of the present disclosure, there is provided a device for managing data placement. The device comprises: at least one processing unit; and at least one memory coupled to the at least one processing unit and having instructions stored thereon for being executed by the at least one processing unit, the instructions, when executed by the at least one processing unit, causing the device to perform acts. The acts include: in response to receiving a backup request for backing up raw data, storing the raw data in a first storage system so as to form a raw copy; obtaining metadata corresponding to the raw data, the metadata comprising abstract information of the raw data; storing the metadata in a blockchain system in a second storage system so as to form a metadata copy, the first storage system and the second storage system being independent storage systems provided by a first vendor and a second vendor respectively; and managing the raw data by using the raw copy and the metadata copy.

According to example implementations of the present disclosure, the acts further comprise: collecting multiple states of multiple storage systems that are applicable to store either of the raw copy and the metadata copy, respectively; and selecting a corresponding storage system of the first storage system and the second storage system from the multiple storage systems based on the multiple states.

According to example implementations of the present disclosure, collecting multiple states of the multiple storage systems respectively comprises: regarding a given storage system among the multiple storage systems, determining at least one of the following states of the given storage system: a name, vendor, storage space, data throughput, latency, error rate and priority of the given storage system.

According to example implementations of the present disclosure, managing the raw data by using the raw copy and the metadata copy comprises: in response to receiving a recovery request for the raw data, obtaining the metadata copy from the second storage system; generating metadata based on the raw copy; and managing the raw data based on the metadata copy and the generated metadata.

According to example implementations of the present disclosure, managing the raw data by using the raw copy and the metadata copy comprises: in response to determining the generated metadata matches the metadata copy, verifying the raw copy as not changed; and returning the raw copy.

According to example implementations of the present disclosure, the acts further comprise: in response to determining the generated metadata does not match the metadata copy, verifying the raw copy as changed; and returning a notification indicating the raw copy has been changed.

According to example implementations of the present disclosure, the acts further comprise: in response to determining the generated metadata does not match the metadata copy, reducing a priority of at least one of the first storage system and the second storage system.

According to example implementations of the present disclosure, the first storage system and the second storage system are cloud-based storage systems.

According to example implementations of the present disclosure, the acts further comprise: in response to receiving a further backup request for backing up further raw data, storing the further raw data in the second storage system to form a further raw copy; obtaining further metadata corresponding to the further raw data, the further metadata comprising abstract information of the further raw data; storing the further metadata in the first storage system to form a further metadata copy; and managing the further raw data by using the further raw copy and the further metadata copy.

According to example implementations of the present disclosure, the acts further comprise: dividing a raw data object into a group of raw data blocks; and selecting a raw data block as the raw data from the group of raw data blocks.

According to example implementations of the present disclosure, there is provided a computer program product. The computer program product is tangibly stored on a non-transient computer readable medium and comprises machine executable instructions which are used to implement the method according to the present disclosure.

According to example implementations of the present disclosure, there is provided a computer readable medium. The computer readable medium has machine executable instructions stored thereon, the machine executable instructions, when executed by at least one processor, causing the at least one processor to implement the method according to the present disclosure.

The present disclosure can be implemented as a method, device, system and/or computer program product. The computer program product can include a computer-readable storage medium, on which the computer-readable program instructions for executing various aspects of the present disclosure are loaded.

The computer-readable storage medium can be a tangible apparatus that maintains and stores instructions utilized by the instruction executing apparatuses. The computer-readable storage medium can be, but is not limited to, an electrical storage device, magnetic storage device, optical storage device, electromagnetic storage device, semiconductor storage device or any appropriate combinations of the above. More concrete examples of the computer-readable storage medium (non-exhaustive list) include: portable computer disk, hard disk, RAM, ROM, erasable programmable read-only memory (EPROM or flash), static random-access memory (SRAM), portable compact disk read-only memory (CD-ROM), digital versatile disk (DVD), memory stick, floppy disk, mechanical coding devices, punched card stored with instructions thereon, or a projection in a slot, and any appropriate combinations of the above. The computer-readable storage medium utilized herein is not interpreted as transient signals per se, such as radio waves or freely propagated electromagnetic waves, electromagnetic waves propagated via waveguide or other transmission media (such as optical pulses via fiber-optic cables), or electric signals propagated via electric wires.

The described computer-readable program instruction can be downloaded from the computer-readable storage medium to each computing/processing device, or to an external computer or external storage via Internet, local area network, wide area network and/or wireless network. The network can include copper-transmitted cable, optical fiber transmission, wireless transmission, router, firewall, switch, network gate computer and/or edge server. The network adapter card or network interface in each computing/processing device receives computer-readable program instructions from the network and forwards the computer-readable program instructions for storage in the computer-readable storage medium of each computing/processing device.

The computer program instructions for executing operations of the present disclosure can be assembly instructions, instructions of instruction set architecture (ISA), machine instructions, machine-related instructions, microcodes, firmware instructions, state setting data, or source codes or target codes written in any combinations of one or more programming languages, wherein the programming languages consist of object-oriented programming languages, e.g., Smalltalk, C++ and so on, and traditional procedural programming languages, such as "C" language or similar programming languages. The computer-readable program instructions can be implemented fully on the user computer, partially on the user computer, as an independent software package, partially on the user computer and partially on the remote computer, or completely on the remote computer or server. In the case where remote computer is involved, the remote computer can be connected to the user computer via any type of networks, including local area network (LAN) and wide area network (WAN), or to the external computer (e.g., connected via Internet using the Internet service provider). In some implementations, state information of the computer-readable program instructions is used to customize an electronic circuit, e.g., programmable logic circuit, field programmable gate array (FPGA) or programmable logic array (PLA). The electronic circuit can execute computer-readable program instructions to implement various aspects of the present disclosure.

Various aspects of the present disclosure are described herein with reference to flow chart(s) and/or block diagram(s) of methods, apparatus (systems) and computer program products according to implementations of the present disclosure. It should be understood that each block of a flow chart and/or block diagram and the combination of various blocks in the flow chart and/or block diagram can be implemented by computer-readable program instructions.

The computer-readable program instructions can be provided to the processing unit of general-purpose computer, dedicated computer or other programmable data processing apparatuses to manufacture a machine, such that the instructions that, when executed by the processing unit of the computer or other programmable data processing apparatuses, generate an apparatus for implementing functions/actions stipulated in one or more blocks in the flow chart and/or block diagram. The computer-readable program instructions can also be stored in the computer-readable storage medium and cause the computer, programmable data processing apparatus and/or other devices to work in a particular manner, such that the computer-readable medium stored with instructions contains an article of manufacture, including instructions for implementing various aspects of the functions/actions stipulated in one or more blocks of the flow chart and/or block diagram.

The computer-readable program instructions can also be loaded into computer, other programmable data processing apparatuses or other devices, so as to execute a series of operation steps on the computer, other programmable data processing apparatuses or other devices to generate a computer-implemented procedure. Therefore, the instructions executed on the computer, other programmable data processing apparatuses or other devices implement functions/actions stipulated in one or more blocks of the flow chart and/or block diagram.

The flow chart(s) and/or block diagram(s) in the drawings illustrate system architecture, functions and operations that may be implemented by system, method and computer program product according to multiple implementations of the present disclosure. In this regard, each block in a flow chart and/or block diagram can represent a module, a part of program segment or code, wherein the module and the part of program segment or code include one or more executable instructions for performing stipulated logic functions. In some alternative implementations, it should be noted that the functions indicated in the block can also take place in an order different from the one indicated in the drawings. For example, two successive blocks can be in fact executed in parallel or sometimes in a reverse order dependent on the involved functions. It should also be noted that each block in the flow chart and/or block diagram and combinations of the blocks in the flow chart and/or block diagram can be implemented by a hardware-based system exclusive for executing stipulated functions or actions, or by a combination of dedicated hardware and computer instructions.

Various implementations of the present disclosure have been described above and the above description is only exemplary rather than exhaustive and is not limited to the implementations of the present disclosure. Many modifications and alterations, without deviating from the scope and spirit of the explained various implementations, will be apparent to those skilled in the art. The selection of terms in the text aims to best explain principles and actual applications of each implementation and technical improvements made in the market by each implementation, and to enable those skilled in the art to understand implementations of the present disclosure.

What is claimed is:

1. A method for managing data placement, comprising:
   in response to receiving a backup request for backing up raw data, storing the raw data in a first storage system so as to form a raw copy;
   obtaining metadata corresponding to the raw data, the metadata comprising abstract information of the raw data;
   storing the metadata in a blockchain system in a second storage system so as to form a metadata copy, the first storage system and the second storage system being independent storage systems provided by a first vendor and a second vendor respectively; and
   managing the raw data by using the raw copy and the metadata copy;
   wherein managing the raw data by using the raw copy and the metadata copy comprises:
   in response to receiving a recovery request for the raw data,
   obtaining the metadata copy from the second storage system;
   generating metadata based on the raw copy; and
   managing the raw data based on the metadata copy and the generated metadata.

2. The method of claim 1, further comprising:
   collecting multiple states of multiple storage systems that are applicable to store either of the raw copy and the metadata copy, respectively; and
   selecting corresponding storage systems of the first storage system and the second storage system from the multiple storage systems based on the multiple states.

3. The method of claim 2, wherein collecting multiple states of the multiple storage systems respectively comprises: regarding a given storage system among the multiple storage systems,
   determining at least one of the following states of the given storage system: a name, vendor, storage space, data throughput, latency, error rate and priority of the given storage system.

4. The method of claim 1, wherein managing the raw data by using the raw copy and the metadata copy comprises: in response to determining the generated metadata matches the metadata copy,
   verifying the raw copy as not changed; and
   returning the raw copy.

5. The method of claim 4, further comprising: in response to determining the generated metadata does not match the metadata copy,
   verifying the raw copy as changed; and
   returning a notification indicating the raw copy has been changed.

6. The method of claim 5, further comprising: in response to determining the generated metadata does not match the metadata copy, reducing a priority of at least one of the first storage system and the second storage system.

7. The method of claim 1, wherein the first storage system and the second storage system are cloud-based storage systems.

8. The method of claim 1, further comprising:
   in response to receiving a further backup request for backing up further raw data, storing the further raw data in the second storage system to form a further raw copy;
   obtaining further metadata corresponding to the further raw data, the further metadata comprising abstract information of the further raw data;
   storing the further metadata in the first storage system to form a further metadata copy; and
   managing the further raw data by using the further raw copy and the further metadata copy.

9. The method of claim 1, further comprising:
   dividing a raw data object into a group of raw data blocks; and
   selecting a raw data block as the raw data from the group of raw data blocks.

10. A device for managing data placement, comprising:
    at least one processing unit; and
    at least one memory coupled to the at least one processing unit and having instructions stored thereon for being executed by the at least one processing unit, the instructions, when executed by the at least one processing unit, causing the device to perform acts comprising:

in response to receiving a backup request for backing up raw data, storing the raw data in a first storage system so as to form a raw copy;

obtaining metadata corresponding to the raw data, the metadata comprising abstract information of the raw data;

storing the metadata in a blockchain system in a second storage system so as to form a metadata copy, the first storage system and the second storage system being independent storage systems provided by a first vendor and a second vendor respectively; and managing the raw data by using the raw copy and the metadata copy;

wherein managing the raw data by using the raw copy and the metadata copy comprises:

in response to receiving a recovery request for the raw data, obtaining the metadata copy from the second storage system;

generating metadata based on the raw copy; and managing the raw data based on the metadata copy and the generated metadata.

11. The device of claim 10, wherein the acts further comprise:

collecting multiple states of multiple storage systems that are applicable to store either of the raw copy and the metadata copy, respectively; and selecting corresponding storage systems of the first storage system and the second storage system from the multiple storage systems based on the multiple states.

12. The device of claim 11, wherein collecting multiple states of the multiple storage systems respectively comprises: regarding a given storage system among the multiple storage systems, determining at least one of the following states of the given storage system: a name, vendor, storage space, data throughput, latency, error rate and priority of the given storage system.

13. The device of claim 10, wherein managing the raw data by using the raw copy and the metadata copy comprises: in response to determining the generated metadata matches the metadata copy, verifying the raw copy as not changed; and returning the raw copy.

14. The device of claim 13, wherein the acts further comprise: in response to determining the generated metadata does not match the metadata copy, verifying the raw copy as changed; and returning a notification indicating the raw copy has been changed.

15. The device of claim 14, wherein the acts further comprise: in response to determining the generated metadata does not match the metadata copy, reducing a priority of at least one of the first storage system and the second storage system.

16. The device of claim 10, wherein the first storage system and the second storage system are cloud-based storage systems.

17. The device of claim 10, wherein the acts further comprise:

in response to receiving a further backup request for backing up further raw data, storing the further raw data in the second storage system to form a further raw copy;

obtaining further metadata corresponding to the further raw data, the further metadata comprising abstract information of the further raw data;

storing the further metadata in the first storage system to form a further metadata copy; and managing the further raw data by using the further raw copy and the further metadata copy.

18. A computer program product, tangibly stored on a non-transient computer readable medium and comprising machine executable instructions which, when executed by a device, cause the device to perform a method for managing data placement, comprising:

in response to receiving a backup request for backing up raw data, storing the raw data in a first storage system so as to form a raw copy;

obtaining metadata corresponding to the raw data, the metadata comprising abstract information of the raw data;

storing the metadata in a blockchain system in a second storage system so as to form a metadata copy, the first storage system and the second storage system being independent storage systems provided by a first vendor and a second vendor respectively; and managing the raw data by using the raw copy and the metadata copy;

wherein managing the raw data by using the raw copy and the metadata copy comprises:

in response to receiving a recovery request for the raw data, obtaining the metadata copy from the second storage system;

generating metadata based on the raw copy; and managing the raw data based on the metadata copy and the generated metadata.

19. The computer program product of claim 18, further comprising:

collecting multiple states of multiple storage systems that are applicable to store either of the raw copy and the metadata copy, respectively; and selecting corresponding storage systems of the first storage system and the second storage system from the multiple storage systems based on the multiple states.

20. The computer program product of claim 19, wherein collecting multiple states of the multiple storage systems respectively comprises: regarding a given storage system among the multiple storage systems, determining at least one of the following states of the given storage system: a name, vendor, storage space, data throughput, latency, error rate and priority of the given storage system.

\* \* \* \* \*